United States Patent [19]

Pinazza

[11] Patent Number: 5,515,575
[45] Date of Patent: May 14, 1996

[54] HINGE TO CONNECT THE LEGS AND FRAME OF A PAIR OF SPECTACLES

[75] Inventor: Renzo Pinazza, Domegge di Cadore, Italy

[73] Assignee: Euroframes Srl, Pieve di Soligo, Italy

[21] Appl. No.: 265,735

[22] Filed: Jun. 27, 1994

[30] Foreign Application Priority Data

Dec. 17, 1993 [IT] Italy .................. UD93A0251

[51] Int. Cl.⁶ ............................................. G02C 5/22
[52] U.S. Cl. ............................................. 16/228; 351/113
[58] Field of Search ........................... 16/228, 332, 334, 16/344, 337; 351/113, 114, 111, 121

[56] References Cited

U.S. PATENT DOCUMENTS

| | | | |
|---|---|---|---|
| 2,098,921 | 11/1937 | Mandaville | 351/113 |
| 3,837,735 | 9/1974 | Guillet | 16/228 |
| 4,005,930 | 2/1977 | Guenin | 16/228 |
| 4,461,548 | 7/1984 | Drlik | 16/228 |
| 4,570,289 | 2/1986 | Consolati | 16/228 |
| 4,689,851 | 9/1987 | Beyer | 16/228 |

*Primary Examiner*—Maurina T. Rachuba
*Assistant Examiner*—Chuck Y. Mah
*Attorney, Agent, or Firm*—Antonelli, Terry, Stout & Kraus

[57] ABSTRACT

Hinge to connect the legs (14) and frame (12) of a pair of spectacles, in which the frame (11-12) comprises a connecting pivot (15) and a cam shaved element while the leg (14) comprises at least a resilient resisting cylinder (17- 18) and seating (19), the resilient resisting cylinder (17) including at its forward end a surface with an inclined plane (20) together with a lateral extension forming an abutment tooth (21), the cam shaved element associated with the frame (11-12) including two surfaces (16a-16b) formed as inclined planes at an angle to each other and at an angle to the plane containing the lengthwise axis of sliding of the cylinder (17).

6 Claims, 1 Drawing Sheet

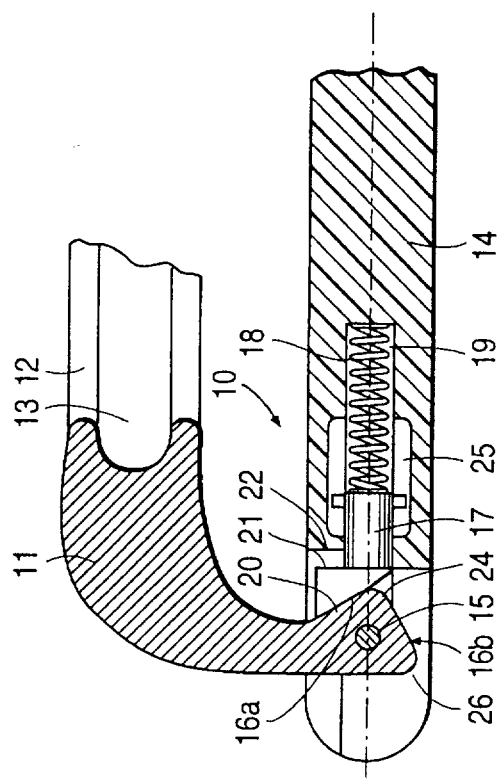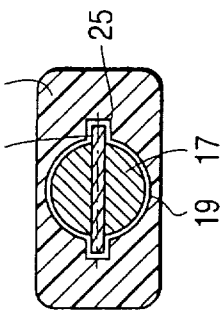

HINGE TO CONNECT THE LEGS AND FRAME OF A PAIR OF SPECTACLES

BACKGROUND OF THE INVENTION

This invention concerns a hinge to connect the legs and frame of a pair of spectacles.

The connecting hinge according to the invention enables the frame of the spectacles, or the part holding the lenses, to be resiliently connected to the relative legs.

The invention can be fitted to any type of sunglasses or spectacles to assist the eyesight and can be adapted substantially to any frame advantageously, but not only, of a type including non-metallic components such as horn, tortoiseshell, artificial or synthetic materials or compounds of a resinous nature.

Very many types of hinges to connect the frame and legs of spectacles are disclosed in the state of the art and make possible a given determined spreading apart of the legs beyond their normal open position of use.

The state of the art commonly discloses the use of hinges provided with at least one cam element having a suitable profile able to cooperate with an at least partly spherical element movably guided inside a cylindrical seating made within the leg itself.

The movement of the spherical element within the cylindrical seating is resiliently resisted, for instance, by a spring lodged at the rear within the cylindrical seating.

This spherical element may consist of a metallic ball directly resisted by the spring or of a metallic cylinder having a hemispherical end, as disclosed in FR-A-2.026.893.

EP-B-0006075 discloses an embodiment in which the sphere is not directly opposed by the spring, but an element is interposed which has the form of a second sphere or flat element to reduce friction between the sphere and the spring and to assist the sliding of the sphere within the cylindrical seating.

The limits of maximum spreading apart of the legs are generally applied by actions of direct opposition between the spherical element and a part of the cam, with the resulting occurrence of localised stresses at a short distance from the pivoting axis and in severely oblique directions.

FR-A-2.026.893 discloses a hinge in which the pivoting axis is embodied with a pivot that connects with a hinged joint two metallic elements solidly connected to the frame and relative leg respectively.

The resilient system of stabilisation and positioning of the legs consists of cooperation between a profiled cam solidly fixed to the frame and a metallic sphere acting as a tappet in relation to the profile of the cam itself and movably guided within a cylindrical seating provided within the metallic element solidly fixed to the leg.

The maximum limit of spreading apart of the legs is provided by an action of abutment between a step made on the profile of the cam and the end of a prolongation of the metallic component of the leg.

The known embodiments entail some shortcomings. The use of a spherical element as an element to cooperate with the cam generates stresses of a punctuate type. These stresses are concentrated at the point where the spherical element comes into contact with substantially flat surfaces forming the profile of the cam.

This entails the need to use especially strong material to form the cam so as to prevent punctuate wear and deformations on the profile of the cam.

Moreover, the abutment elements which limit the maximum spreading apart of the legs are in an outer position and, as time goes by, lead to a deterioration of the aesthetic appearance and to possible functional damage.

SUMMARY OF THE INVENTION

The present applicants have designed, tested and embodied this invention to overcome the problems encountered in the state of the art for a long time now by businessmen in this field and to achieve further advantages.

According to the invention the connecting hinge includes at least one first metallic element solidly fixed to the frame and associated with the relative leg by means of a pivot which forms the axis of the hinge between the leg and the frame.

This first metallic element may be additional to the frame and be secured thereto with screws or anchorage pins or may form an integral part of the frame, for instance when the frame is metallic.

This first metallic element has a cam-shaped profile at least in the vicinity of the pivot of the hinge.

According to the invention an axial cylindrical seating is provided in the leg and lodges a movably guided metallic cylinder resisted at its rear by a resilient thrust element.

According to a variant a second metallic plate element containing the cylindrical seating for the metallic cylinder is solidly fixed in a suitable hollow provided in the leg.

The metallic cylinder has at its forward end a profile with an inclined surface that extends towards the frame; this inclined surface cooperates with the cam-shaped profile of the first metallic element.

To be more exact, if the leg is rotated about the connecting pivot and brought from its closed position to an open position or viceversa, the forward end profile with an inclined surface of the metallic cylinder is brought alternately into contact with two substantially flat and united surfaces that form the profile of the cam of the first metallic element.

These two positions of adherence of two flat surfaces to each other form the two positions of stability of the leg in relation to the frame in a closed position and open position respectively.

This adherence of flat surfaces to each other does not create tensions or deformations of a punctuate type and therefore enables a less resistant and less expensive material to be used for the cam than that used in the state of the art.

The movement from one position of stability to the other is brought about by the sliding of the metallic cylinder in its cylindrical seating, the sliding being caused by the thrust against the cylinder applied by the connecting end of the cam-shaped profile during rotation of the leg.

The sliding of the metallic cylinder in its cylindrical seating is resisted, as we have said, by the resilient thrust element, which is positioned to the rear of the cylinder and thrusts the cylinder towards the cam.

According to the invention the maximum spreading apart of the legs is limited by an abutment tooth consisting of a lateral prolongation of the forward profile of the cylinder, this prolongation being positioned advantageously, but not only, on a plane perpendicular to the axis of the cylinder.

The abutment tooth abuts against an abutment surface, which mates with the abutment tooth and is provided in a desired position on the leg at the side of the cylindrical seating. The position of the abutment surface determines the limit position which can be reached by the cylinder in the cylindrical seating, and therefore the limit of maximum spreading apart of the legs.

The abutment limiting the outward spreading apart of the legs acts on parts which cannot be seen from the outside, and therefore any splintering or deformation does not impair the aesthetic appearance of the spectacles to which the connecting hinge according to the invention is fitted.

Lengthwise grooves are included in the leg above the cylindrical seating and enable the metallic cylinder to slide to its farthest abutment position. These grooves assist in guiding the metallic cylinder and prevent twisting or rotation of the same which might otherwise impair an efficient adherence between the mutually contacting surfaces.

According to a variant the metallic cylinder comprises a pin, which juts out from at least one side and cooperates with an appropriate guide groove provided in the side of the cylindrical seating. This pin enables the cylinder to slide lengthwise and to be guided.

This pin also prevents rotation of the cylinder so as to achieve an excellent adherence of the contact surfaces of the cylinder and cam-shaped profile to each other.

Moreover, this pin prevents any expulsion of the cylinder by the thrust of the spring, for instance during dismantling of the hinge.

BRIEF DESCRIPTION OF THE DRAWINGS

The attached figures are given as a non-restrictive example and show a preferred embodiment of the invention as follows:

FIG. 1 shows a section of the connecting hinge according to the invention in its closed position;

FIG. 2 shows the connecting hinge of FIG. 1 in its position of use;

FIG. 3 shows the connecting hinge of FIG. 1 in its position with the legs spread apart as far as possible;

FIG. 4 shows in an enlarged scale a cross-section along the line A—A of FIG. 2.

DETAILED DESCRIPTION OF THE PREFERRED EMBODIMENTS

A connecting hinge 10 shown in the figures includes a first metallic element 11 which is secured to the two ends of a part 12 which holds lenses 13.

Where the lens-holder part 12 is metallic, the first metallic element 11 can be solidly fixed, by welding for instance, so as to form an integral part of the frame of the spectacles.

Where the lens-holder part 12 consists of a non-metallic material such as a plastic material of a resinous type, horn, tortoise-shell, etc., the first metallic element 11 can be fixed to the lens-holder part 12 by means of screws, bolts, pins, etc.

The first metallic element 11 is associated with a leg 14 by means of a hinge pivot 15 and comprises a cam-shaped profile at least in the vicinity of the hinge pivot 15.

In this case a hollow is provided in the leg 14 and forms a cylindrical seating 19 for a metallic cylinder 17 that has at its forward end a surface 20 positioned on an inclined plane.

According to a variant, which is not shown here, a second metallic element of a plate type containing the cylindrical seating 19 is solidly fixed to the leg 14.

The metallic cylinder 17 is movably guided within the cylindrical seating 19 and is resisted at its rearward end by a resilient thrust element 18.

The system for stabilisation of the leg 14 in its respective open and closed positions and position of maximum spreading apart from the other leg 14 is provided by cooperation between the cam-shaped profile of the first metallic element 11 and the inclined-plane surface 20 of the metallic cylinder 17.

The cam-shaped profile of the first metallic element 11 includes an advantageously rounded vertex 24 that defines two substantially flat surfaces 16a and 16b.

The angle formed by the vertex 24 between the two flat surfaces 16a–16b has a value such that it enables the vertex 24 to slide on the inclined-plane surface 20 of the metallic cylinder 17 without thereby causing scratches, abrasions or deformations of the surfaces in mutual contact.

In the closed position of the leg 14 there is a first position of stability, in which the inclined-plane surface 20 of the cylinder 17 adheres to the substantially flat first surface 16a of the first metallic element 11 including the cam (see FIG. 1).

Rotation of the leg 14 causes the sliding of the inclined-plane surface 20 against the vertex 24 of the cam-shaped profile of the first metallic element 11, with a resulting rearward movement of the cylinder 17 due to the thrust exerted by the vertex 24.

When the point of maximum compression has been passed, the cylinder 17 is thrust by the resilient thrust element 18 to the position where the inclined-plane surface 20 adheres to the substantially flat second surface 16b of the cam-shaped profile of the first metallic element 11 (FIG. 2). This position places the leg 14 in its stable position of use.

The further spreading apart of the leg 14 causes a further pressure against the metallic cylinder 17, this pressure being now applied by the vertex 26 of the cam-shaped profile of the first metallic element 11.

This pressure causes the rearward sliding of the metallic cylinder 17 to the point where an abutment tooth 21 of the cylinder 17 abuts against an abutment surface 22 provided on the leg 14 beside the cylindrical seating 19 (FIG. 3). This abutment surface 22 determines the limit of the maximum spreading apart of the legs 14.

The contact between the abutment tooth 21 and the abutment surface 22 affects only the internal and non-visible components and does not impair the appearance of the parts forming the connecting hinge 10, lens-holder part 12 or leg 14.

The hinge 10 according to the invention includes means to prevent rotation of the metallic cylinder 17 during its sliding within the cylindrical seating 19.

According to a variant the metallic cylinder 17 comprises a pin 23 that juts out advantageously and symmetrically from both sides of the cylinder 17. This pin 23 cooperates with an appropriate guide groove 25 provided at the sides of the cylindrical seating 19 so as to guide the cylinder 17 in its lengthwise movement and to prevent the cylinder 17 rotating or moving sideways and thus impairing the efficacy of the positions of stability.

The pin 23 also prevents the cylinder 17 being thrust out of the cylindrical seating 19 by the thrust of the resilient thrust element 18, for instance during dismantling of the hinge 10.

The pin 23 may consist of the head of a screw or of a cylinder cooperating with a spring or may be fixed laterally to the metallic cylinder 17.

I claim:

1. A hinge for connecting a leg to a frame for a pair of spectacles, comprising:

a first element solidly fixed to the frame, the first element having a cam-shaped end including first and second surfaces formed as inclined planes at an angle to each other and separated by a vertex;

a leg pivotally connected to the first element, the leg having a longitudinally extending seating, a sliding element slidable in the seating and means for resiliently thrusting the sliding element toward the first element, the sliding element having a forward end adjacent the first element with an inclined plane and having a lateral extension forming an abutment tooth;

a connection pivot connecting the leg to the first element to allow pivotal movement of the leg with respect to the first element about the connection pivot from a closed position in which the inclined plane of the forward end of the sliding element is thrust into contact with the first surface of the cam-shaped end profile of the first element, past an intermediate position in which the inclined plane of the forward end of the sliding element is in contact with the vertex of the cam-shaped end profile of the first element thrusting the sliding element rearward in the seating, to an open position in which the inclined plane of the forward end of the sliding element is thrust into contact with the second surface of the cam-shaped end profile of the first element, and to a past opened position in which the inclined plane of the forward end of the sliding element is at an angle to the second surface of the cam-shaped end of the first element thrusting the sliding element rearward into the seating.

2. A hinge according to claim 1, wherein the first element is connected to the frame by connecting means.

3. A hinge according to claim 1, wherein the first element integral with the frame.

4. A hinge according to claim 1, wherein the seating is a cylindrical seating and the sliding element includes a cylinder slidable in the cylindrical seating, wherein the inclined plane and lateral extension are provided on a forward end of the cylinder outside the cylindrical seating.

5. A hinge according to claim 4, further comprising a longitudinally extending groove adjacent the cylindrical seating and pin means extending from a side of the cylinder and slidable within the groove to guide the cylinder in the cylindrical seating and prevent rotation of the cylinder in the cylindrical seating.

6. A hinge according to claim 4, wherein the leg comprises an abutment surface outside the cylindrical seating, the abutment surface extending substantially at a right angle to the longitudinal axis of the cylindrical seating and contacting with the abutment tooth to define a limit of the maximum opening of the leg with respect to the frame.

* * * * *